United States Patent
Perazio

(10) Patent No.: US 7,389,593 B2
(45) Date of Patent: Jun. 24, 2008

(54) LOCATING AND TRACING TOOL

(75) Inventor: Gilles Perazio, Saint Marcellin (FR)

(73) Assignee: DEFI - Distribution Europeenne de Fournitures Industrielles, Chatte (FR)

( * ) Notice: Subject to any disclaimer, the term of this patent is extended or adjusted under 35 U.S.C. 154(b) by 322 days.

(21) Appl. No.: 11/116,665

(22) Filed: Apr. 27, 2005

(65) Prior Publication Data
US 2005/0247789 A1 Nov. 10, 2005

(30) Foreign Application Priority Data
May 6, 2004 (FR) .................................. 04 05110

(51) Int. Cl.
*B44D 3/38* (2006.01)
(52) U.S. Cl. ..................................... 33/414; 33/DIG. 21
(58) Field of Classification Search ................... 33/381, 33/382, 413, 414, 451, 759, 760, 761, DIG. 1, 33/DIG. 21, 461
See application file for complete search history.

(56) References Cited

U.S. PATENT DOCUMENTS

| | | | |
|---|---|---|---|
| 5,459,932 A | 10/1995 | Rando | 33/DIG. 21 |
| 5,894,675 A * | 4/1999 | Cericola | 33/451 |
| 6,209,213 B1 * | 4/2001 | Moe | 33/760 |
| 6,209,219 B1 * | 4/2001 | Wakefield et al. | 33/761 |
| 6,230,416 B1 * | 5/2001 | Trigilio | 33/451 |
| 6,453,568 B1 * | 9/2002 | Hymer | 33/DIG. 21 |
| 6,789,329 B1 * | 9/2004 | Hester | 33/760 |
| 7,134,212 B2 * | 11/2006 | Marshall et al. | 33/DIG. 21 |
| 2002/0088134 A1 * | 7/2002 | Watts | 33/760 |
| 2002/0178596 A1 * | 12/2002 | Malard et al. | 33/286 |
| 2003/0005590 A1 * | 1/2003 | Snyder | 33/382 |
| 2003/0192193 A1 * | 10/2003 | Potts et al. | 33/759 |
| 2004/0168335 A1 * | 9/2004 | Pritchard | 33/760 |
| 2004/0172846 A1 * | 9/2004 | McRae | 33/760 |

FOREIGN PATENT DOCUMENTS

WO    WO 02/093108 A    11/2002

* cited by examiner

*Primary Examiner*—G. Bradley Bennett
(74) *Attorney, Agent, or Firm*—William H. Eilberg

(57) ABSTRACT

A tool of the invention comprises a casing having two mutually perpendicular elongate plane bearing faces extending in two longitudinal directions. A first laser beam generator generates a laser line in the first longitudinal direction. Air levels are used to check that a bearing face is horizontal. Retractable linear marking means such as a tracing cord or a graduated tape can be deployed in the second longitudinal direction, thereby extending the second bearing face, and retracted into the casing by winding them onto a spool provided with a handle. This kind of tool considerably facilitates marking and tracing lines on a construction site and constitutes an easily transportable one-piece object.

13 Claims, 3 Drawing Sheets

LOCATING AND TRACING TOOL

TECHNICAL FIELD OF THE INVENTION

The present invention relates to tools used in the construction industry to trace lines marked out with respect to each other.

Marking and tracing lines generally necessitate measurements of lengths and angles, tracing lines, horizontal or vertical marks, which generally necessitates a plurality of tools: lengths are measured with rules; angles are measured with protractors; tracing is effected using a tracing cord, i.e. a cord charged with a powder that is deposited on a surface when the cord is vibrated; levels or horizontals are marked with air levels, and verticals are marked with a plumbline.

Thus these operations generally necessitate the successive or simultaneous use of several separate tools.

For example, to trace on a given plane surface a line parallel to a marker line, a line of laser light may be generated by means of an apparatus having air levels and a laser line generator such as that described in the documents US 2002/0178596 and WO 02/093108, with the laser line placed parallel to the mark, and the distance to the marker line measured until this distance is constant. The trace must then be made permanent by a chalk line applied by means of a tracing cord that is aligned along the laser line. Note the necessity to manipulate a plurality of measuring and tracing means.

The measuring and tracing means constitute separate objects which it is relatively inconvenient to move around to carry out successive operations at several locations on a construction site. It is difficult to carry several objects and there is always the risk of dropping or losing one of the measuring and tracing means during transportation, not to mention the risk of leaving them somewhere on a construction site.

Should one of the measuring or tracing means go missing, the measuring or tracing operation becomes either impossible or highly inaccurate.

SUMMARY OF THE INVENTION

The problem addressed by the present invention is therefore that of designing a new marking and tracing tool that appropriately combines within itself a plurality of tracing and marking means, thereby constituting a unitary one-piece system that is easier to transport, each marking or tracing means being disposed to guarantee acceptable accuracy of measurement or tracing without interfering with the accuracy of the other means of the tool.

The invention aims to provide a tool of the above kind in which each marking or tracing means is directly accessible to the user, and that constitutes a compact and rugged system with the additional feature of being very easy to transport and hold.

To achieve the above and other objects, the invention generally proposes a marking and tracing tool, comprising a casing having an elongate plane first bearing face and an elongate plane second bearing face that are mutually perpendicular and extend in respective longitudinal directions, having at least a first laser beam generator adapted to generate a first laser beam in the first longitudinal direction, and having one or more air levels adapted to check that a bearing face is horizontal, and furthermore comprising retractable linear marking means adapted to be deployed in the second longitudinal direction, thereby extending the second bearing face, and to be retracted into the casing, by winding them onto a spool in the casing.

Clearly the casing itself, with two perpendicular bearing faces, constitutes a square for measuring right angles. Because the tool may rest with one of its plane bearing surfaces on the ground, the other bearing surface can be used to mark a vertical. The first laser beam generator indicates the first longitudinal direction, for subsequent tracing or for marking relative to a distant area. The air levels are used to check that one bearing face is horizontal, which simultaneously checks that the other bearing face is vertical. It is therefore possible to check that the laser line in the first longitudinal direction produced by the first laser beam generator is horizontal and/or vertical. The retractable linear marking means, which extend the second bearing face, are used for marking perpendicular to the first bearing face, for example for fixing a perpendicular direction or for measuring a distance.

In a first embodiment, the retractable linear marking means consist of a flexible tape graduated in units of length. It is then possible, by means of the laser beam, to indicate directly a line parallel to a marker line whose distance is simultaneously measured by the retractable linear marking means.

In a second embodiment, the retractable linear marking means consist of a tracing cord wound on the spool and associated with a container of tracing powder through which it passes between the spool and an exit orifice in the vicinity of the distal end of the second bearing face. As a result, the tracing cord can be used to trace directly a line perpendicular to the first bearing face, so that a plurality of parallel lines can be traced simultaneously that are all perpendicular to a base line on which the first bearing face is resting.

The first laser beam generator is preferably adapted to generate a flat laser beam in the median longitudinal plane containing the two longitudinal directions, in order to trace a line of laser light on a plane surface on which the first bearing face is resting. For indicating a first line, this avoids having to trace a line by means of a tracing cord passing through a distant light spot produced by the laser beam.

The tool advantageously further comprises a second laser beam generator adapted to generate a second laser beam in the second longitudinal direction in order to mark a point on a distant surface. This can facilitate distant marking in the second longitudinal direction.

The tool preferably comprises two air levels with the first air level oriented for checking that the first bearing face is horizontal in the first longitudinal direction, and the second air level oriented for checking that the first bearing face is horizontal in the transverse direction. A first function is then to place the first bearing face in a horizontal orientation checked by the air levels, in order to check that the surface against which the first bearing face is placed is horizontal, or to check that a surface against which the second bearing face is applied is vertical. A second function is obtained by applying the first bearing face against a substantially vertical surface, the transverse second air level providing a direct check that said surface is vertical. A third function is obtained by generating a laser line on a wall using the first laser generator, the transverse second air level providing a quick way to orient the laser line vertically.

Handling can be improved by providing a handle in the acute angle between the bearing faces. The handle is advantageously annular and offset towards the first bearing face, whereas the spool onto which the retractable linear marking means are wound is advantageously offset towards the second bearing face.

The tool may be used on construction sites to trace lines or to make marks in the most diverse positions. In particular, it may be beneficial to fix the tool to a wall or to concrete sheeting. For that purpose, it can advantageously be provided that bearing faces have a dovetail-shaped cross section, their surface having a width greater than that of the body of the casing and being connected to the body of the casing by oblique re-entrant facets to which can be fixed accessories for fixing the tool against a wall or other support.

It is equally possible to integrate, into the bearing faces of the tool, elements enabling direct fixing of the tool to various supports. For example, those elements may be magnets for fixing to metal surfaces or suckers for fixing to smooth surfaces such as ceramic, porcelain, plaster.

An additional measurement capability may be obtained by providing a face at 45° that extends from the free end of the second bearing face in the direction of the free end of the first bearing face. A 45° angle can then be traced directly using the second bearing face and the face at 45°.

Further measurement and marking capability may be obtained by providing linear graduations along at least one edge of the bearing faces, for example on the re-entrant oblique facets.

An angular graduation may also be provided on a lateral face of the casing centered on the intersection of the bearing faces. In that case, a transverse notch may advantageously be provided at the intersection of the bearing faces, enabling a cord to be engaged in the transverse notch to mark out an acute angle inside the right angle defined by the two bearing faces, the cord then running along the lateral face of the tool body carrying the angular graduations.

The spool may be driven in rotation by a rotating return spring or advantageously be driven in rotation by a handle that the user can operate to wind in and thereby retract the retractable linear marking means.

BRIEF DESCRIPTION OF THE DRAWINGS

Further aspects, features and advantages of the present invention will emerge from the following description of particular embodiments of the invention, given with reference to the appended drawings, in which.

DESCRIPTION OF THE PREFERRED EMBODIMENTS

Figure 1:
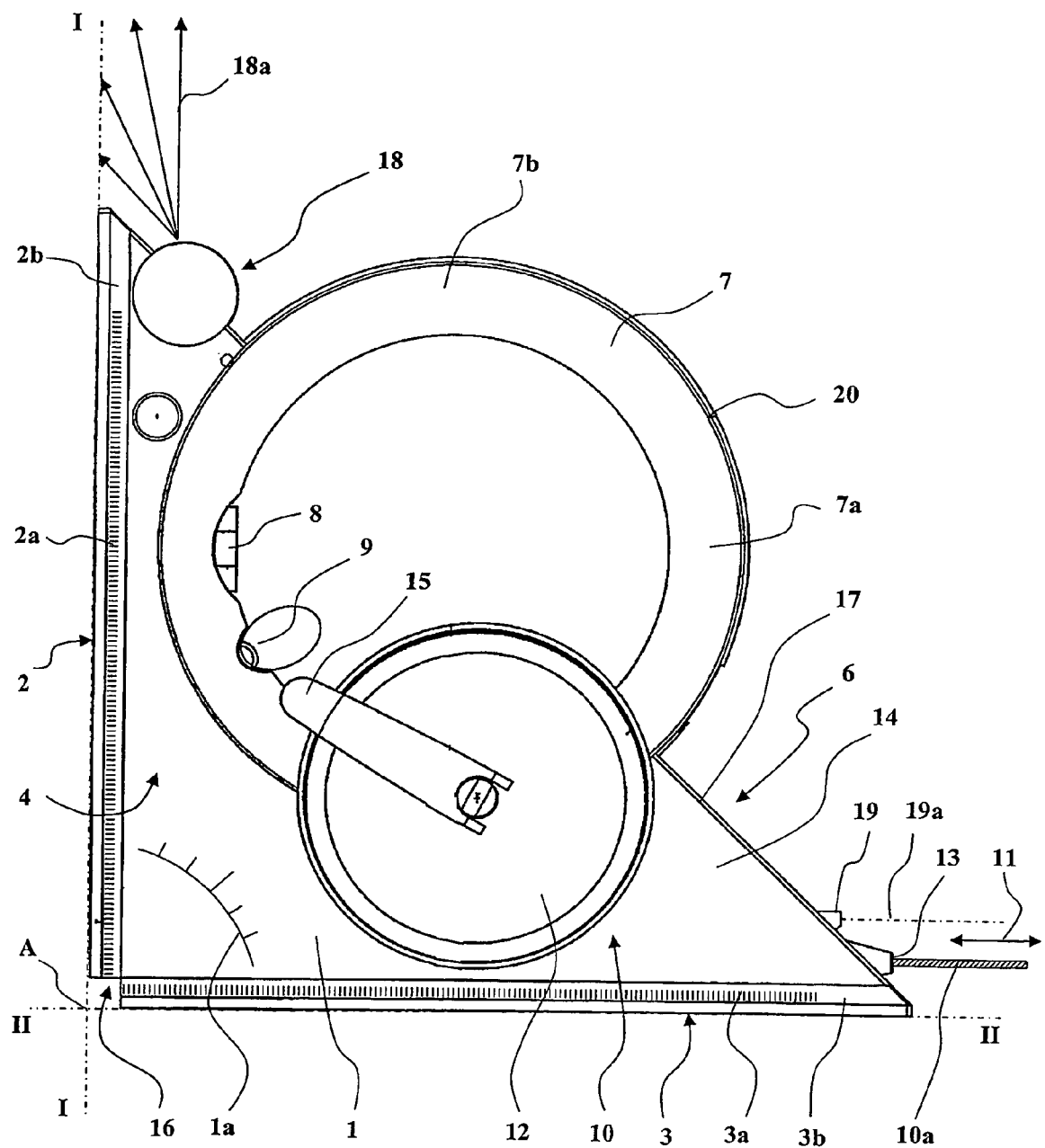
FIG. 1 is a front view of a first embodiment of a marking and tracing tool of the present invention.

The embodiment of a marking and tracing tool according to the invention shown in the figures comprises a casing 1 of flat triangular general shape delimited by an elongate plane first bearing face 2, an elongate plane second bearing face 3, two lateral faces 4 and 5, and a connecting face 6.

The elongate plane first and second bearing faces 2 and 3 are mutually perpendicular and each extends in a respective longitudinal direction I-I or II-II.

A handle 7 is provided in the acute angle between the bearing face 2 and the bearing face 3.

In the example shown, the handle 7 is annular, for ease of holding in all inclined orientations of the tool, i.e. in particular in orientations between a first orientation in which the first bearing face 2 is horizontal and a second orientation in which the second bearing face 3 is horizontal. In the former case, the tool is held by placing the hand in the distal area 7a of the handle 7. In the latter case, the tool is held by placing the hand in the proximal area 7b of the handle 7.

The handle 7 may advantageously be offset in the direction of the first bearing face 2, in the manner shown in FIG. 1, to leave an additional space in the casing 1 between the handle 7 and the second bearing face 3 for housing other marking or measuring means.

One or more air levels are provided in the casing to check that at least one bearing face is horizontal. In the example shown, a first air level 8 is oriented parallel to the first longitudinal direction I-I and a second air level 9 is oriented in a direction perpendicular to the plane formed by the two longitudinal directions I-I and II-II. A pair of air levels 8 and 9 of this kind is used to check that the first bearing face 2 is horizontal when it must be oriented horizontally: the first air level 8 is used to check that the first bearing face 2 is horizontal in the first longitudinal direction I-I, and the second air level 9 is used to check that the first bearing face 2 is horizontal in the transverse direction.

The tool further includes retractable linear marking means 10 adapted to be deployed in the second longitudinal direction II-II, thereby extending the second bearing face 3, in the manner indicated by the arrow 11, and to be retracted into the casing 1, by winding them onto a spool 12 in the casing 1.

The spool 12 is preferably disposed in the vicinity of the second bearing face 3 which means, if the handle 7 is offset towards the first bearing face 2, that a relatively large spool 12 can be accommodated for winding on a considerable length of the retractable linear marking means 10.

In a first application, the retractable linear marking means 10 may take the form of a flexible tape graduated in units of length, for measuring a length from the first bearing face 2 to a remote point in the second longitudinal direction II-II.

In a second application, the retractable linear marking means 10 take the form of a tracing cord, consisting of a cord 10a wound onto the spool 12 and whose end remains outside the casing 1 so that it can be grasped. The cord 10a exits the casing 1 through an orifice 13 close to the free end of the second bearing surface 3. The cord 10a preferably passes through a container of tracing powder 14 between the orifice 13 and the spool 12.

In use, the cord 10a may be pulled out by pulling its end away from the tool in the second longitudinal direction II-II, the cord 10a being charged with powder at this stage. The cord 10a can be placed against a plane receiving surface and caused to vibrate, so that it strikes the bearing surface and releases an appropriate quantity of powder that makes a mark in the second longitudinal direction II-II. The cord 10a can then be rewound onto the spool 12. To this end, the spool 12 is driven in rotation by a return spring or preferably by a handle 15 that the user can operate to wind and retract the retractable linear marking means 10.

Linear graduations 2a and 3a may be provided along at least one edge of the respective bearing faces 2 and 3, for measuring short distances and for quickly marking out and tracing parallel lines (e.g. to mark out the thickness of partition walls or to mark out friezes for painting).

An angular graduation la can be provided on one lateral face 4 of the casing 1, centered on the intersection A of the bearing faces 2 and 3. Note in FIG. 1 the presence of the transverse notch 16 at the intersection A of the bearing faces 2 and 3. As indicated above, this transverse notch 16 allows the engagement of a cord for marking an acute angle. Another function of this transverse notch 16 is to make it possible to position the tool accurately relative to a marked point, making alignment possible.

The connecting face 6 can include a face 17 at 45° that extends from the free end of the second bearing face 3 to the free end of the first bearing face 2.

Figure 2:
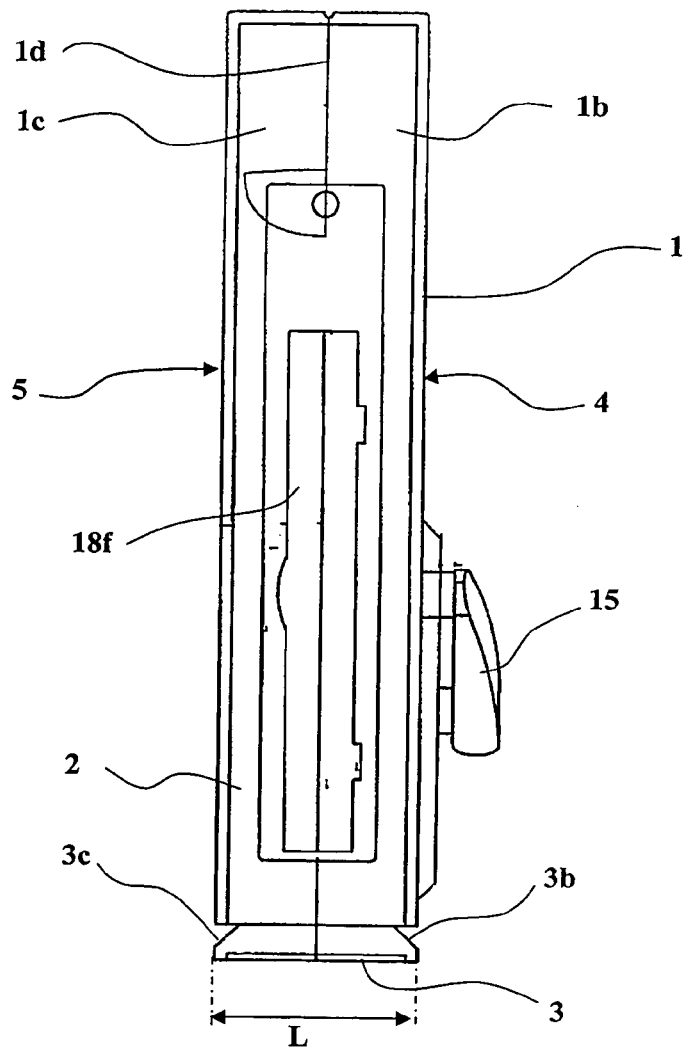
FIG. 2 is a left-hand side view of the FIG. 1 tool.
Figure 3:
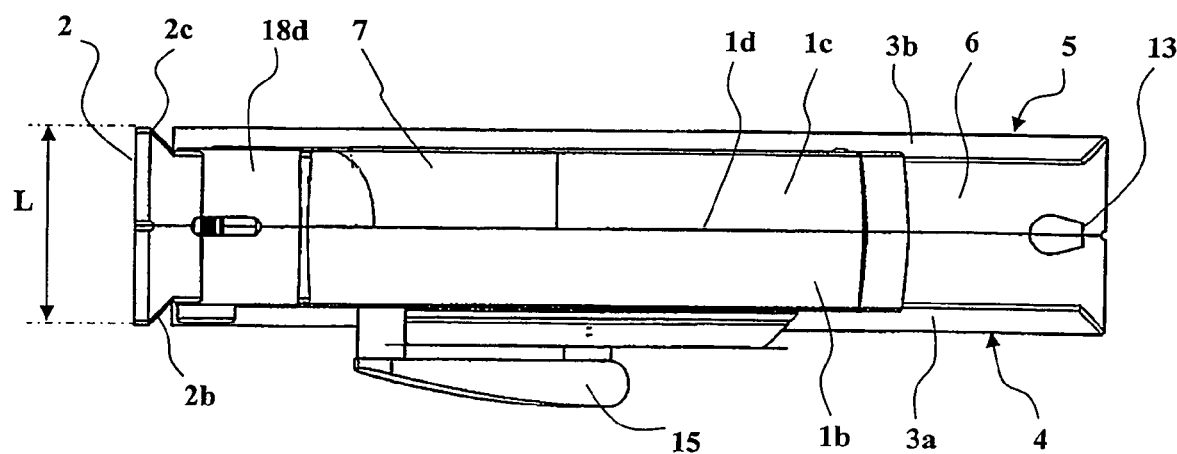
FIG. 3 is a top view of the FIG. 1 tool.

The views of FIGS. 2 and 3 show that the bearing faces 2 and 3 have a dovetail-shaped cross section, their surface having a width L greater than that of the central portion of the casing 1 and being connected to the central portion of the casing 1 by respective re-entrant oblique facets 2b and 2c, 3b and 3c, to which may be fixed accessories for fixing the tool against a wall or other support. In particular, accessories may be envisaged that comprise magnetized plates to assure satisfactory fixing against metal sheeting for pouring concrete, as well as accessories provided with suckers and stops for satisfactory fixing against a smooth surface. The re-entrant oblique facets can advantageously receive the linear graduations 2a and 3a.

Instead of attached fixing accessories, the bearing faces 2 and 3 can comprise, integrated into their thickness, fixing elements such as magnets or suckers with stops for fixing to metal surfaces or to smooth surfaces, respectively.

Near the free end of the first bearing face 2 is a first laser beam generator 18 adapted to generate a first laser beam 18a in the first longitudinal direction I-I. The first laser beam generator 18 is preferably adapted to generate a flat laser beam 18a in the median longitudinal plane containing the two longitudinal directions I-I and II-II. The laser generator then generates a line of laser light on a plane surface on which the first bearing face 2 is resting, for example on a wall or on the ground.

The bubbles of the air levels 8 and 9 are preferably aligned with the first laser beam generator 18 to obtain great accuracy.

A second laser beam generator 19 may be provided near the free end of the second bearing face 3 and adapted to generate a second laser beam 19a in the second longitudinal direction II-II to mark a spot on a distant surface.

Figure 4:
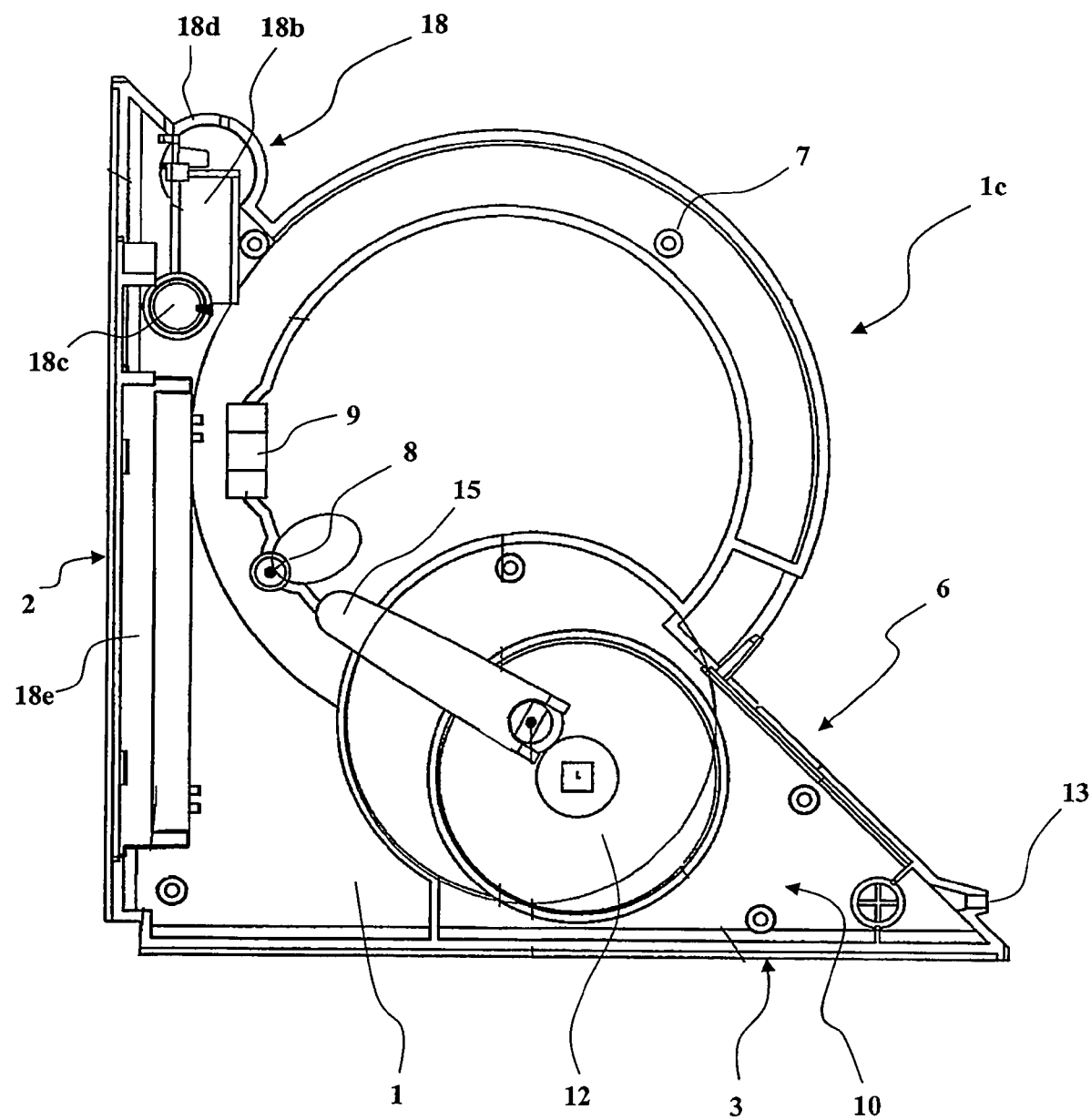
FIG. 4 is a front view of the FIG. 1 tool, with the casing open.

In practice, the first laser beam generator 18, which is shown in more detail in FIG. 4, includes a laser module 18b with an on-off button 18c and generating a laser beam diffused by optical means to generate the flat laser beam 18a, the exit of the module being protected by a shell 18d. The laser module 18b is supplied with electrical energy by batteries inserted into a battery housing 18e accessible via a removable cover 18f (FIG. 2).

A mark 20 can be provided on the handle 7 for marking out an angle of 45° centered at the intersection A of the longitudinal lines I-I and II-II. This complements the markings that can be made using the angular graduation 1a.

The casing 1 may advantageously comprise two triangular shells 1b and 1c that are assembled together on a joint plane 1d in the plane of the longitudinal lines I-I and II-II.

The container 14 of tracing powder can be accessible via a movable cover in the connecting face 6, for example to refill it with powder.

The handle 15 can be connected to the spool 12 by a mechanism that can include a clutch and a system of gears for fast rewinding.

The tool according to the invention as defined hereinabove is used in particular for marking out a plumb line, a horizontal level, a vertical mark or an angular mark, and for tracing them on any support.

Diverse uses are made possible by the combination of the features of the invention, and in particular: positioning a tube, visualizing its location before tracing, extending the square over a great distance, positioning partition walls, producing shower trays, etc.

The present invention is not limited to the embodiments that have been described explicitly and includes variants and generalizations that fall within the scope of the following claims.

There is claimed:

1. A marking and tracing tool comprising a casing having an elongate plane first bearing face and an elongate plane second bearing face that are mutually perpendicular and extend in respective longitudinal directions, having at least a first laser beam generator adapted to generate a first laser beam in the first longitudinal direction, and having one or more air levels adapted to check that a bearing face is horizontal, said tool further comprising retractable linear marking means adapted to be deployed in the second longitudinal direction, thereby extending the second bearing face, and to be retracted into the casing, by winding them onto a spool in the casing, wherein the retractable linear marking means consist of a tracing cord wound on the spool and associated with a container of tracing powder through which it passes between the spool and an exit orifice in the vicinity of the distal end of the second bearing face, and wherein the tool comprises two air levels with the first air level oriented for checking that the first bearing face is horizontal in the first longitudinal direction and the second air level oriented for checking that the first bearing face is horizontal in the transverse direction.

2. The tool according to claim 1, wherein the first laser beam generator is adapted to generate a flat laser beam in the median longitudinal plane containing the two longitudinal directions in order to trace a line of laser light on a plane surface on which the first bearing face is resting.

3. The tool according to claim 1, further comprising a second laser beam generator adapted to generate a second laser beam along the second longitudinal direction in order to mark a point on a distant surface.

4. The tool according to claim 1, comprising a handle in the acute angle between the bearing faces.

5. The tool according to claim 4, wherein the handle is annular and offset towards the first bearing face and the spool onto which the retractable linear marking means are wound is offset towards the second bearing face.

6. The tool according to claim 1, wherein the bearing faces have a dovetail-shaped cross section, their surface having a width greater than that of the central portion of the casing and being connected to the central portion of the casing by oblique re-entrant facets to which can be fixed accessories for fixing the tool against a wall or other support.

7. The tool according to claim 1, wherein the bearing faces comprise, integrated into their thickness, fixing elements comprising magnets or suckers with stops for fixing to metal surfaces or smooth surfaces, respectively.

8. The tool according to claim 1, having a face at 45° which extends from the free end of the second bearing face in the direction of the free end of the first bearing face.

9. The tool according to claim 1, having linear graduations provided along at least one edge of the bearing faces.

10. The tool according to claim 1, wherein an angular graduation is provided on a lateral face of the casing centered on the intersection of the bearing faces, and a transverse notch is provided at the intersection of the bearing faces.

11. The tool according to claim 1, wherein the spool is driven in rotation by a handle that the user can operate to wind in and thereby retract the retractable linear marking means.

12. A marking and tracing tool comprising a casing having an elongate plane first bearing face and an elongate plane second bearing face that are mutually perpendicular and extend in respective longitudinal directions, having at least a first laser beam generator adapted to generate a first laser beam in the first longitudinal direction, and having one or more air levels adapted to check that a bearing face is horizontal, said tool further comprising retractable linear marking means adapted to be deployed in the second longitudinal direction, thereby extending the second bearing face, and to be retracted into the casing, by winding them onto a spool in the casing, wherein the first laser beam generator is adapted to generate a flat laser beam in the median longitudinal plane containing the two longitudinal directions in order to trace a line of laser light on a plane surface on which the first bearing face is resting.

13. A marking and tracing tool comprising a casing having an elongate plane first bearing face and an elongate plane second bearing face that are mutually perpendicular and extend in respective longitudinal directions, having at least a first laser beam generator adapted to generate a first laser beam in the first longitudinal direction, and having one or more air levels adapted to check that a bearing face is horizontal, said tool further comprising retractable linear marking means adapted to be deployed in the second longitudinal direction, thereby extending the second bearing face, and to be retracted into the casing, by winding them onto a spool in the casing, wherein the tool comprises two air levels with the first air level oriented for checking that the first bearing face is horizontal in the first longitudinal direction and the second air level oriented for checking that the first bearing face is horizontal in the transverse direction.

\* \* \* \* \*